US012522783B2

(12) United States Patent
Swanson

(10) Patent No.: US 12,522,783 B2
(45) Date of Patent: Jan. 13, 2026

(54) TABLETOP TORCH MADE FROM A LOG AND METHOD OF USE THEREOF

(71) Applicant: Erik Swanson, Engelwood, CO (US)

(72) Inventor: Erik Swanson, Engelwood, CO (US)

( * ) Notice: Subject to any disclaimer, the term of this patent is extended or adjusted under 35 U.S.C. 154(b) by 0 days.

(21) Appl. No.: 18/966,170

(22) Filed: Dec. 3, 2024

(65) Prior Publication Data

US 2025/0092332 A1 Mar. 20, 2025

Related U.S. Application Data

(63) Continuation of application No. 17/521,247, filed on Nov. 8, 2021, now abandoned.

(60) Provisional application No. 63/110,921, filed on Nov. 6, 2020.

(51) Int. Cl.
*C11C 5/00* (2006.01)

(52) U.S. Cl.
CPC .................................... *C11C 5/008* (2013.01)

(58) Field of Classification Search
CPC ...................................................... C11C 5/008
USPC .......................................................... 431/288
See application file for complete search history.

(56) References Cited

U.S. PATENT DOCUMENTS

D799,681 S * 10/2017 Smigaj ......................... D23/403
9,890,950 B2 * 2/2018 Masterson ................ F23D 3/16

* cited by examiner

*Primary Examiner* — Allen R. B. Schult
*Assistant Examiner* — William C Weinert
(74) *Attorney, Agent, or Firm* — Juneau & Mitchell; Todd L. Juneau

(57) ABSTRACT

A tabletop torch comprised of an upright wooden log with a upwardly facing top surface that has a plurality of wick bores drilled vertically into it is described. The wick bores have wicks received in them through which to ignite and sustain the flame of the torch. Additionally the top surface is concave and includes a plurality of smaller shallower holes drilled downwardly across its surface. These holes along with the wick bores and the concave surface serve as reservoirs for candle wax and as the wax therein and on ignites the individuals flames from the wick join into a single larger flame.

17 Claims, 5 Drawing Sheets

TABLETOP TORCH MADE FROM A LOG AND METHOD OF USE THEREOF

BACKGROUND

Since prehistoric time, people have enjoyed communing around a fire, such as a campfire. Unfortunately, campfires can present a fire hazard especially in densely populated or wooded areas where an errant ember could cause an uncontrolled fire that threatens or destroys landscaping and residences. Accordingly, recreational fires are often highly regulated through covenants and local ordinances minimizing the circumstances and conditions in which a person or gathering of people may enjoy a recreational fire.

Contained raised firepits and enclosed patio fireplaces, such as chimneys, are often utilized on patios and decks, but even these are banned in certain locales. They can also consume copious amounts of wood that may be difficult to come by and/or expensive especially in urban and suburban neighborhoods. Often traditional patio fireplaces and firepits are not particularly portable and cannot be easily moved from table to table or transported to other locations. Further, although safer than traditional campfires, the risk of an ember being wafted onto dry grass, dry leaves or other combustibles in its general vicinity remains.

For most, the only opportunity to enjoy a flame on a deck or patio is limited to the use of candles. And while multi-wick candles do exist, the multiple discreet flames emanating from each wick is aesthetically a poor substitute for a lively larger flame.

DETAILED DESCRIPTION

Figure 1:
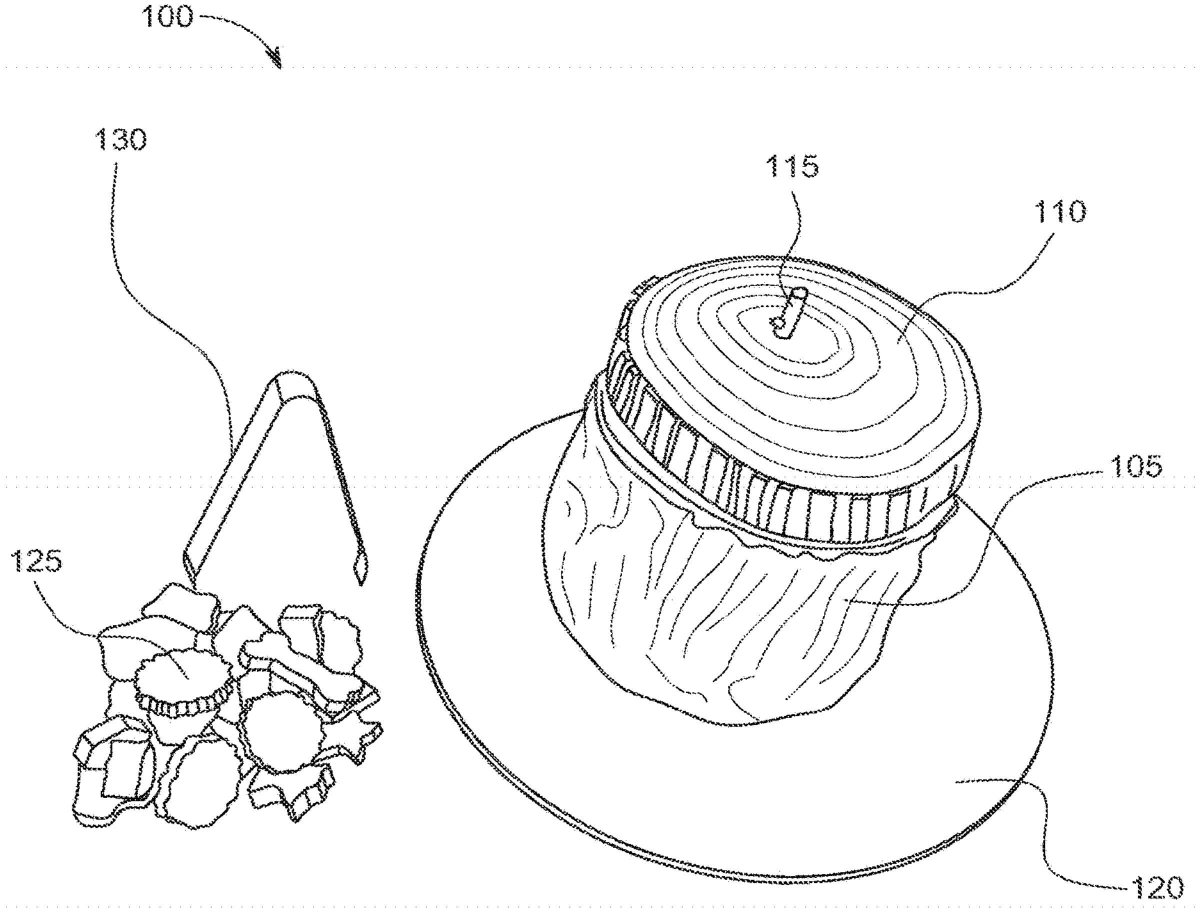
FIG. 1 is an isometric front view of a tabletop torch and accruements according to one embodiment of the present invention.

Embodiments of the present invention comprise a tabletop torch comprised of an upright wooden log base with an upwardly facing top surface that has a plurality of wick bores drilled vertically into it. The wick bores have wicks received in them through which to initially ignite and thereafter assist in sustaining the flame(s) of the torch. Additionally the top surface is often concave and includes a plurality of smaller shallower reservoir holes drilled downwardly across its surface. These holes along with the wick bores and the concave surface serve as reservoirs for candle wax and as the wax therein and thereon ignites, the individuals flames from the various wicks join into a single larger flame.

In use, the wax soaked wicks are initially lit and the heat from the individual flames melt the wax contained in the wicks and the wick bores. With time, the heat melts the surrounding wax contained on and in the concave surface and in the reservoir holes drilled therein. After melting, the liquid wax continues to increase in temperature until reaching a temperature that supports burning. The flame from the various wicks merge and a larger flame spreads across the concave surface fueled by the molten wax.

The resulting flame more resembles that of a campfire than a candle; however, because the primary material being burned is wax, it is largely smoke and soot free. Typically, the wood top surface does not burn appreciably but the surface can become charred, especially when the wax is running low, and more concave. Occasionally, pieces of solid wax can be added to the concave surface. Depending on the size of the flame the wax quickly melts and replenishes the wick bores, as well as the surface reservoir holes. In some embodiments, pieces of wax and a pair of tongs are provided to allow observers to add wax pieces to the torch. The wax pieces can be in a variety of shapes and sizes such that adding watch pieces to the fire and watching the shapes melt adds to the enjoyment of observing the burning torch. As can be appreciated, the placement of wax pieces, as well as the amount of wax added, can affect the size and dynamics of the flame.

To extinguish the tabletop torch, a person typically places the cover over the burning log base and lowers it back in place. As long as the candle is properly fed sufficient amounts of wax to prevent the wicks and the wood from burning, the torch can provide up to hundreds of hours of usage.

Terminology

The terms and phrases as indicated in quotation marks (“ ”) in this section are intended to have the meaning ascribed to them in this Terminology section applied to them throughout this document, including in the claims, unless clearly indicated otherwise in context. Further, as applicable, the stated definitions are to apply, regardless of the word or phrase’s case, to the singular and plural variations of the defined word or phrase.

The term “or” as used in this specification and the appended claims is not meant to be exclusive; rather the term is inclusive, meaning either or both.

References in the specification to “one embodiment”, “an embodiment”, “another embodiment, “a preferred embodiment”, “an alternative embodiment”, “one variation”, “a variation” and similar phrases mean that a particular feature, structure, or characteristic described in connection with the embodiment or variation, is included in at least an embodiment or variation of the invention. The phrase “in one embodiment”, “in one variation” or similar phrases, as used in various places in the specification, are not necessarily meant to refer to the same embodiment or the same variation.

The term “couple” or “coupled” as used in this specification and appended claims refers to an indirect or direct physical connection between the identified elements, components, or objects. Often the manner of the coupling will be related specifically to the manner in which the two coupled elements interact.

The term “directly coupled” or “coupled directly,” as used in this specification and appended claims, refers to a physical connection between identified elements, components, or objects, in which no other element, component, or object resides between those identified as being directly coupled The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

The term "unitary" as used herein refers to an item or article that is formed as a single piece as opposed to an item fabricated from separate pieces that are subsequently joined together.

An Embodiment of a Tabletop Torch

An embodiment of a tabletop torch 100 comprising a upright log base 105 are shown in FIGS. 1-5. The log used in the fabrication of the log base (also "log section") can be of any suitable type of wood in a variety of diameters. As shown the bark has been left on the log for aesthetics although variations with the bark removed are also known. During fabrication, the log is cut to a desired length with a flat base or bottom side and a slice of about 0.7-1.2 thick is cut off the top end of the remaining log to form a cover 110 and the torch's log base. The resulting top surface of the log base is spaced from and generally parallel to the bottom side. As can be in FIG. 1 a hole is typically drilled proximate the center of the cover on its topside and a twig glued into the hole to serve as a handle 115.

In at least one variation, the tabletop torch is provided with a plate 120 on which the log base 105 is set, a plurality of solid wax pieces 125 often in a variety of colors and shapes, and a pair of tongs 130, typically metal, which can be used to add wax to the top of the log while the torch is in use. Often the pieces of wax are arranged around the log on the plate where they are easily accessible.

Figure 2:
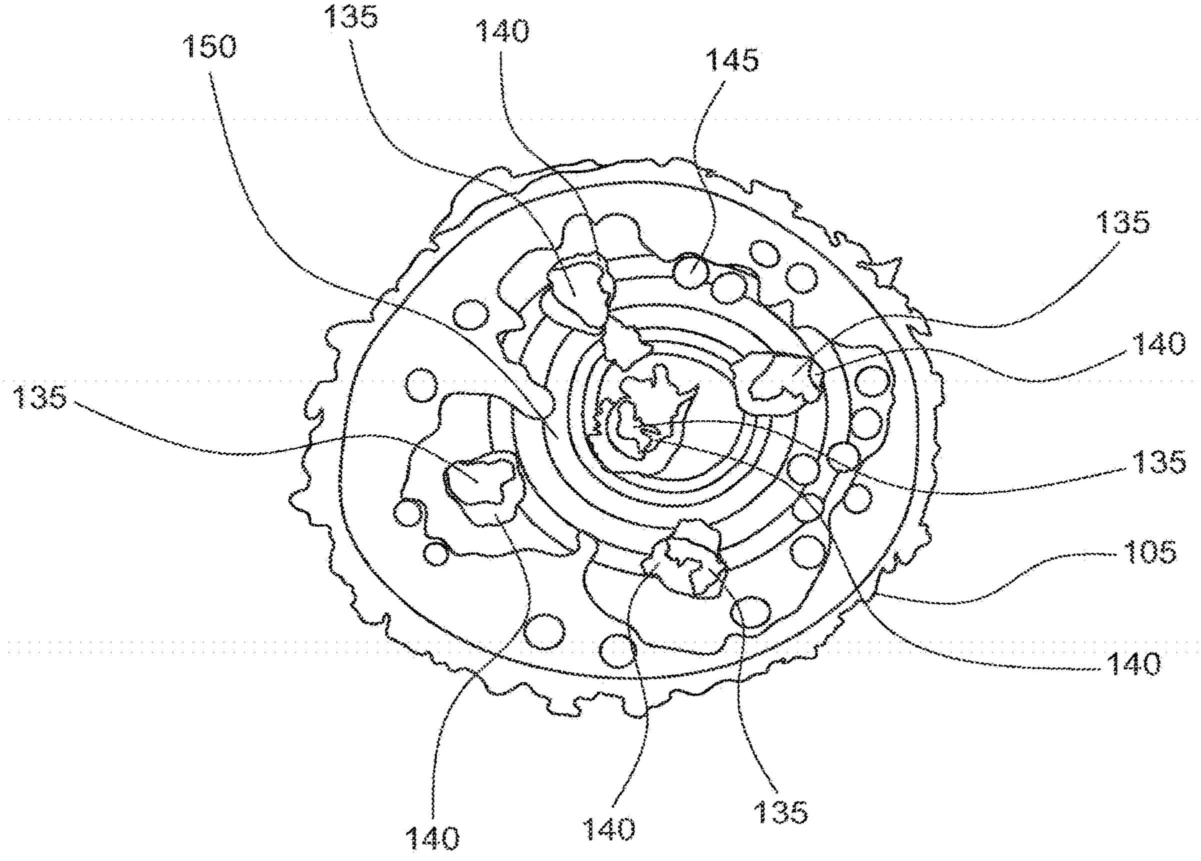
FIG. 2 is a top view of the tabletop torch according to one embodiment of the present invention.
Figure 3:
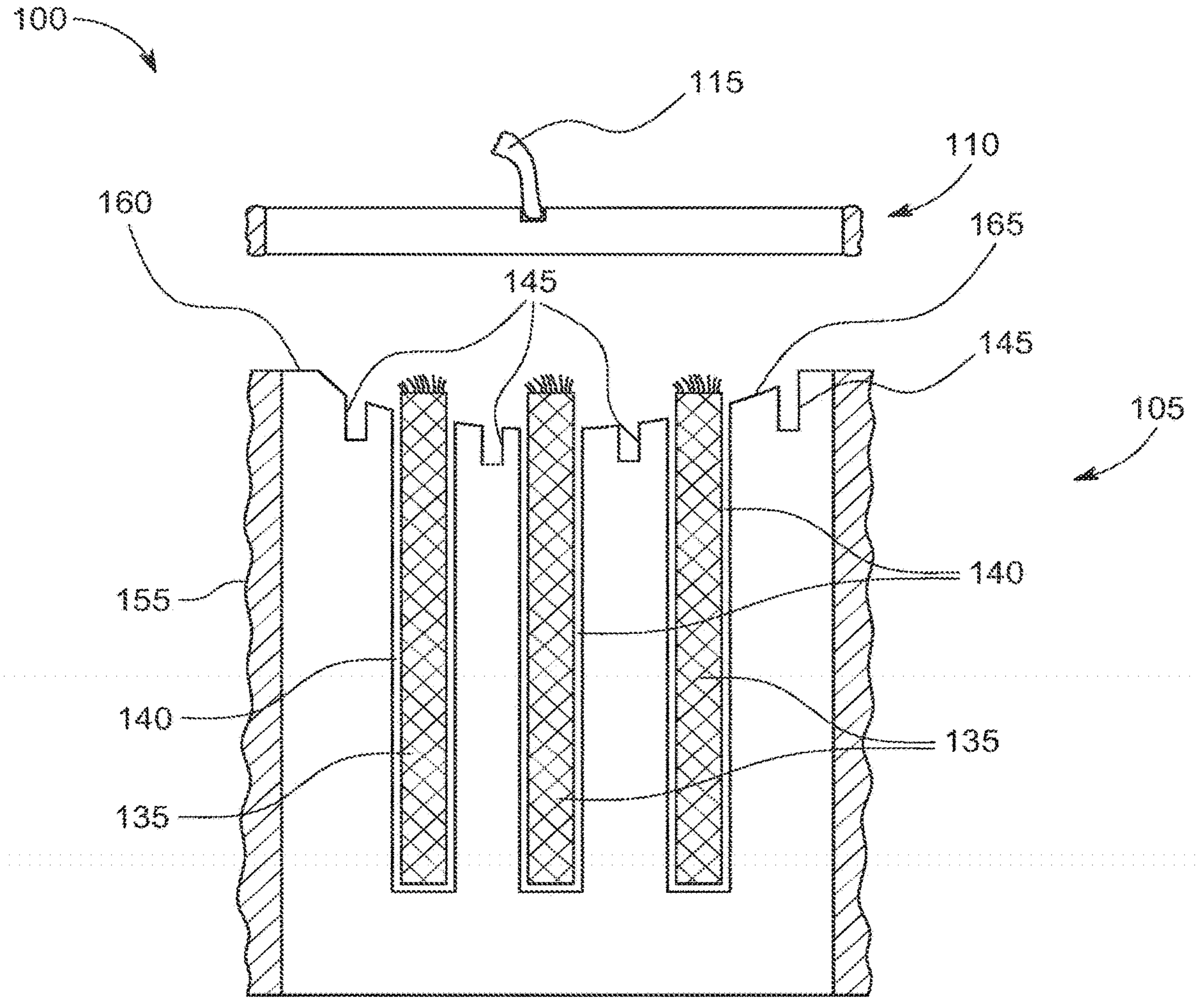
FIG. 3 is a cross sectional view of the tabletop torch according to one embodiment of the present invention.

The top surface of the log base 105 is shown in FIG. 2 and is described herein with further reference to the cross section of FIG. 3. Generally, the top surface of the log is prepared to act as a reservoir for melted or molten wax. Solidified melted wax 150 is illustrated in FIG. 2.

In some variations, as shown in FIG. 3, the surface comprises a generally flat horizontal outer lip 160 with the majority of the surface inside of the lip forming a slightly to moderately concave portion 165. The concave shape helps hold and pool the melted wax thereon. As can be appreciated, the concavity of the surface increases naturally with use of the torch as the surface becomes charred and slowly burns away.

Throughout the concave portion 165, a series of reservoir holes 145 are provided to further hold and pool molten wax 150. The size and depth of the holes can vary but they are generally, although not necessarily, relatively shallow (less than 0.50" deep and more preferably about 0.25" deep and about 0.25" in diameter in some variations). Generally, the more reservoir holes provided the longer the burn time of the torch and the larger the flame created To facilitate initial burning of the torch 100 and to help maintain the torch especially when the wax 150 in the reservoirs has yet to melt or has been largely consumed during use, a plurality of wicks 135 are distributed over the concave portion 165 of the log's surface. In the illustrated embodiments, five wicks 135 are shown but the actual number can vary from as low as one depending on the diameter of the log base 105. Typically, at least one wick is provided at the center of the concave portion, such that molten wax 150 will tend to pool around it.

The wicks 135 are received in wick bores 140 drilled relatively deeply into the log base 105. in general, the wick bores are drilled to a depth about 1-1.5" less than the height of the log base, and typically at least two thirds the length of the log base. The wick bores are generally larger in diameter than the reservoir holes (about 0.75" in the illustrated embodiment) and act not only as holders for the wick but as additional reservoirs for wax, such that molten wax tends to flow into and fill the remaining volume of the bores not taken up by wicks.

The wicks 135 are substantially the length of and generally a little bit longer than the wick bores 140 into which they are received. They typically have a diameter a little bit less than the diameter of the wick bores but wide enough that they are supported in the bores in a vertical upright fashion. For instance, the wicks received in a 0.75" wick bore are typically about 0.50" in diameter, and the wicks received in a 0.5" wick bore are about 0.38" in diameter. The wicks can be made of any suitable material, such as cotton, sisal, jute and fiberglass, and are typically comprise a twisted or braided rope.

The wax 125 & 150 used with the torch can be of any suitable type, but candle wax that burns cleanly and does not smoke is preferred in most embodiments and variations. The torch is typically fabricated and delivered with the wicks 135 saturated with wax and wick bores 140 filled with wax. Further, at least some of the concave portion 165 of the log base surface and the associated reservoir holes 145 are covered or filled with wax 150. The torch is also typically provided with a plurality of solid wax pieces 125 of differing sizes that can be added to the torch as needed or desired. In some variations, the wax may be scented.

A Method of Fabricating an Embodiment of the Tabletop Torch

First, a suitable log is identified having a suitable diameter and aesthetically pleasing characteristics. The log can be from any one of a number of types of trees both coniferous or deciduous. The log is cut to an appropriate length so that the desired height of the log base 105 will be roughly similar to its diameter. The length should not be too long relative to the diameter as to create a risk that knocking the torch 100 could cause it to tip over. The bottom of the log should be substantially planar and generally perpendicular to the log base's length.

Next, a slice about 0.7-1.2" thick is cutoff the top of the cut log forming the log base 105 and its top or cover 110. A small hole is drilled into the top surface of the cover and a handle 115 is inserted and affixed therein. Typically, the handle can comprise a suitably sized twig.

The top surface of the log base 105 is formed by grinding, sanding or otherwise working it to configure a concave portion 165 surrounded by a flat perimeter lip 160 about 0.5-1.0" wide.

The wick bores 140 and reservoir holes 145 can be drilled, and then appropriately sized wicks 135 can be lowered into place.

After the wicks 135 are placed and all the bores and holes 140&145 drilled, molten wax can be poured over the wicks to saturate them and fill the remainder of the volume of the wick bores 140. Overflow wax 150 acts to fill many fi not all of the reservoir holes 145 and covers the surface of the concave portion 165.

The torch is then packaged typically with a plate 120 on which it can be used, a plurality of wax pieces 125 that can be used to feed the torch when it is being used, and a pair of tongs 130 to facilitate adding wax to the fire.

A Method of Using an Embodiment of the Tabletop Torch

Figure 4:
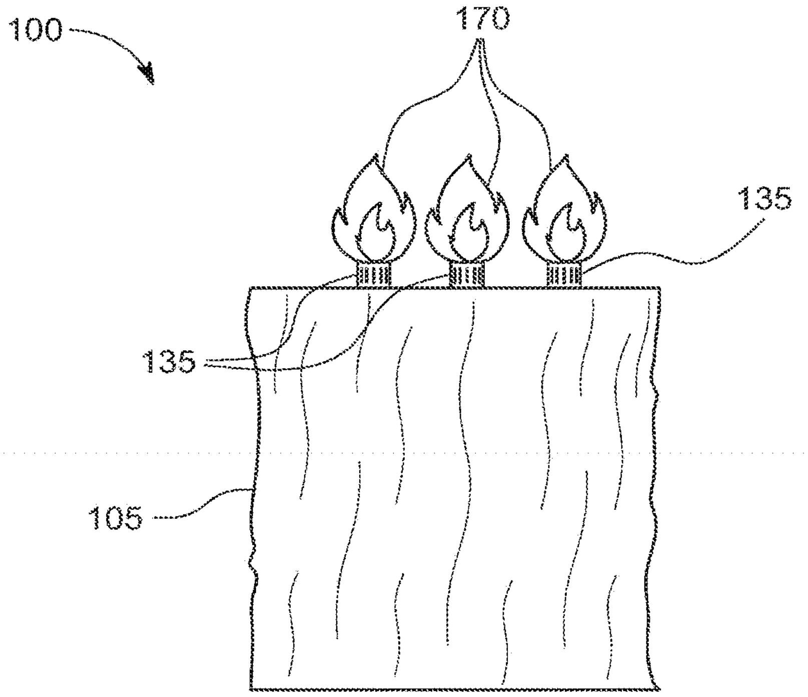
FIG. 4 is an isometric view illustrating the tabletop torch at initial lighting according to one embodiment of the present invention.
Figure 5:
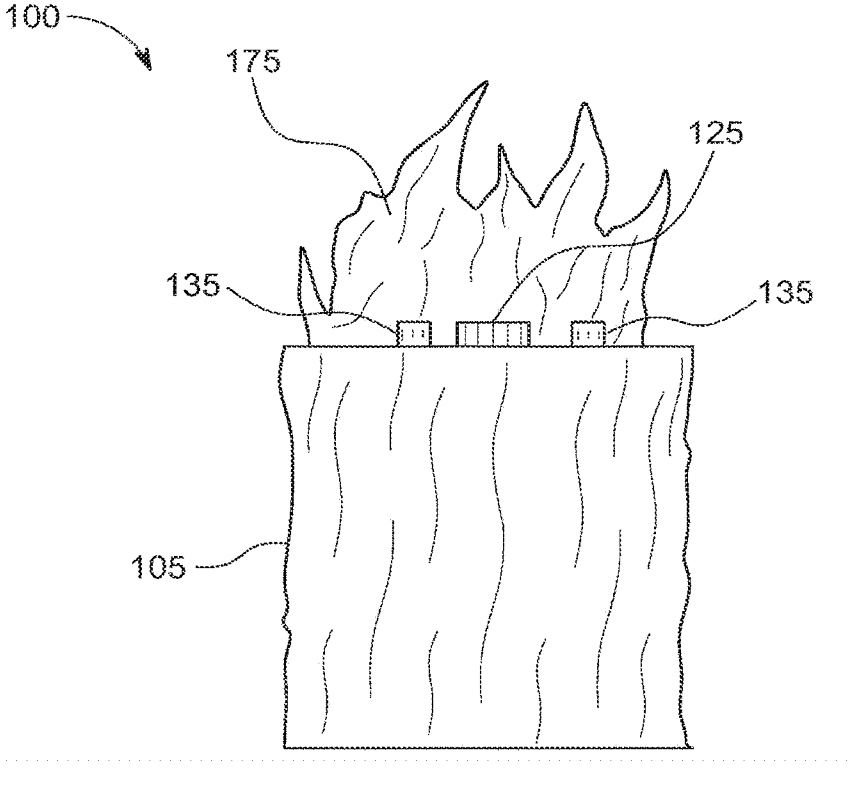
FIG. 5 is an isometric view illustrating the tabletop torch after a warm up period according to one embodiment of the present invention.
Figure 6:
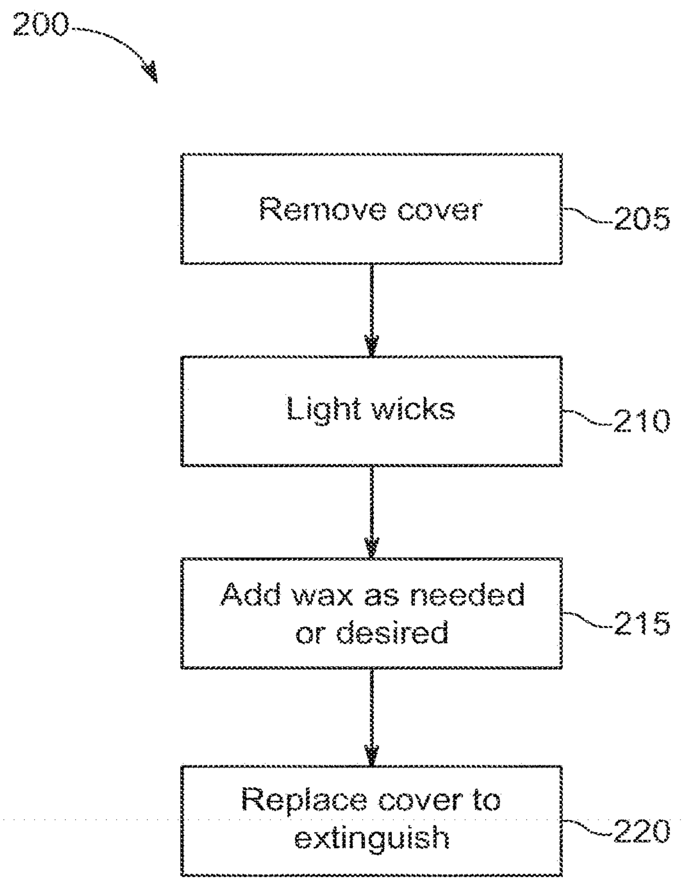
FIG. 6 is a circular flow chart illustrating the use of an embodiment of the tabletop torch.

With reference to the Flow chart of FIG. 6 and FIGS. 4&5, use of the torch is described.

Firstly, the plate 120 containing the torch 100 is placed on a suitable surface. The flames produced by the torch can be large and extend 6-10" above the log base's top surface. The area surrounding the torch should be clear of combustibles. Further, given the nature of the open flame, use indoors is not recommended. While the torch can be used without the plate, use of the plate is advised to provide for greater stability and to contain any molten wax overflow.

As indicated in block 205 of FIG. 6, the cover 110 is removed from the log base 105. The various wicks 135 are then lit typically with a match or lighter creating an individual flame 170 for each wick as shown in FIG. 4 As can be appreciated the wicks are rather large at about 0.38-0.5" in diameter for many embodiments and variations, and as such, can create a significant amount of heat. Overtime, the heat will melt the surrounding wax 150, and typically after 5-20 minutes), the molten wax contained on the concave portion and in the reservoir holes will begin to burn causing the individual flames of each wick to combine in to a single large flame 175 as shown in FIG. 5.

Overtime, the molten wax 150 burns off, and additional wax must be added to the torch to maintain the flame as indicated by block 215. As can be appreciated, more wax contained in the reservoir holes 145 and concave portion 165 typically results in a larger flame; whereas, using less wax can result in a smaller flame. The user and observers can control to some extent the size of the flame based on how much wax is added to the log base's top surface. Wax is typically added in the form of provided solid wax pieces 125. The solid wax pieces can be in variety of sizes and shapes from small to large, such that a user can place both the amount of wax he/she wants one the torch as well as where on the torch he/she desires the wax to be added. The user can further choose pieces of particular shapes that he/she wants to watch melt.

ALTERNATIVE EMBODIMENTS AND VARIATIONS

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A method of fabricating a tabletop torch comprising:
- cutting a log section from a tree, the log section having a generally cylindrical shape and a substantially flat horizontal bottom surface and top surface,
- cutting a slice 0.7-1.2" thick that is parallel to the top surface to form a cover and a log base,
- drilling a hole into the top surface of the cover and affixing a handle,
- forming a concave portion into a top surface of the log base the concave portion sloping downwardly to proximate a center axis of the log section, the concave portion surrounded by a flat perimeter lip about 0.5-1.0" wide,
- drilling one or more wick bores and one or more reservoir holes extending generally vertically into the concave portion of the top surface of the log base, and depositing a wick into each of the one or more wick bores and extending substantially the length of the wick bore, and
- pouring melted wax to fill the one or more wick bores, the one or more reservoir holes, and to cover a surface of the concave portion.

2. The method of fabricating a tabletop torch according to claim 1, wherein the one or more wick bores are closed and extend to a depth 1.0-1.5" less than the height of the log base.

3. The method of fabricating a tabletop torch according to claim 1, wherein the log section has a log length, and the one or more wick bores has a bore length, the bore length being at least two thirds the log length.

4. The method of fabricating a tabletop torch according to claim 1, wherein the wick bores are larger in diameter than the reservoir holes.

5. The method of fabricating a tabletop torch according to claim 1 wherein the wicks are comprised of cotton, sisal, jute, or fiberglass.

6. The method of fabricating a tabletop torch according to claim 1 wherein the handle comprises a wood twig.

7. The tabletop torch of claim 1, wherein the one or more reservoir holes have a depth of less than about 0.50".

8. The method of fabricating a tabletop torch according to claim 1, further including the step of packaging the tabletop torch in combination with a plurality of individual solid wax pieces.

9. The method of fabricating a tabletop torch according to claim 8, wherein the plurality of individual wax pieces comprises a variety of different shapes and sizes.

10. The method of fabricating a tabletop torch according to claim 1, further including the step of packaging the tabletop torch with a plate for receiving the log section thereon, and a pair of tongs.

11. The method of fabricating a tabletop torch according to claim 1, wherein the one or more wick bores comprise at least three wick bores.

12. The method of fabricating a tabletop torch according to claim 1, wherein the one or more reservoir holes comprise at least four reservoir holes.

13. The method of fabricating a tabletop torch according to claim 1, wherein the one or more wick bores comprise at least five wick bores.

14. The method of fabricating a tabletop torch according to claim 1, wherein the one or more reservoir holes comprise at least eighteen reservoir holes.

15. The method of fabricating a tabletop torch according to claim 1, wherein the one or more wick bores are closed and extend to a depth 1.0-1.5" less than the height of the log base, wherein the wick bore length being at least two thirds the log base length, wherein the wick bores are larger in diameter than the reservoir holes, wherein the wicks are comprised of cotton, sisal, jute, or fiberglass, wherein the handle comprises a wood twig, and wherein the reservoir holes have a depth of less than about 0.50", wherein the one or more wick bores comprise at least three wick bores, and wherein the one or more reservoir holes comprise at least four reservoir holes.

16. The method of fabricating a tabletop torch according to claim 15, further including the step of packaging the tabletop torch in combination with a plurality of individual solid wax pieces, a plate for receiving the log section thereon, and a pair of tongs.

17. The method of fabricating a tabletop torch according to claim 15, wherein the one or more wick bores comprise at least five wick bores, and wherein the one or more reservoir holes comprise at least eighteen reservoir holes.

* * * * *